United States Patent [19]
Kuribayashi

[11] Patent Number: 5,321,463
[45] Date of Patent: Jun. 14, 1994

[54] LINEAR TIME COUNTER INDICATING TAPE RUNNING AMOUNT

[75] Inventor: Yasuji Kuribayashi, Maebashi, Japan

[73] Assignee: Victor Company of Japan, Ltd., Yokohama, Japan

[21] Appl. No.: 735,304

[22] Filed: Jul. 24, 1991

[30] Foreign Application Priority Data

Jul. 24, 1990 [JP] Japan .................. 2-195437

[51] Int. Cl.$^5$ .............................................. G01B 7/02
[52] U.S. Cl. ........................................ 364/562; 377/45
[58] Field of Search ............... 364/562; 360/74.2, 137; 377/112, 45, 18

[56] References Cited

U.S. PATENT DOCUMENTS

| | | | |
|---|---|---|---|
| 4,239,957 | 12/1980 | Satoh et al. ........................... | 377/45 |
| 4,280,159 | 7/1981 | Nakayama .......................... | 364/562 |
| 4,292,509 | 9/1981 | Sato et al. ........................... | 377/18 |
| 4,370,684 | 1/1983 | Kanayama et al. ................. | 360/74.2 |
| 4,411,008 | 10/1983 | d'Alayer de Costemore d'Arc et al. ...................................... | 364/562 |
| 4,423,455 | 12/1983 | Fukuoka ............................. | 360/137 |

FOREIGN PATENT DOCUMENTS 58-13994 1/1983 Japan.

Primary Examiner—Jack B. Harvey
Assistant Examiner—Thomas Peeso
Attorney, Agent, or Firm—Jacobson, Price, Holman & Stern

[57] ABSTRACT

A linear time counter for calculating a tape running amount on the basis of a reel rotation number, comprises a reel rotation pulse detection mechanism for detecting the number of reel rotation pulses or reel rotation pulse edges, and a count and calculation processing portion for adding or subtracting values of tape running times t to calculate an accumulated value of the tape running times, wherein when any of the supply reel and the take-up reel rotates by one interval of the reel rotation pulses or reel rotation pulse edges, the number of reel rotation pulses or reel rotation pulse edges counted by the other reel is assumed as n, and the above-mentioned running time t obtained by converting a running amount of the tape to a running time at the time of a constant speed running is expressed as follows:

$$t = (1 + n - K|1 - n|)/M$$

where K is a constant determined by the tape thickness, the tape length, and the radius of the reel hubs, and M is a constant determined by the sum of reel rotation pulses and reel rotation pulse edges of the supply reel and the take-up reel with respect to a fixed tape running amount at the central portion of the length of the tape.

7 Claims, 5 Drawing Sheets

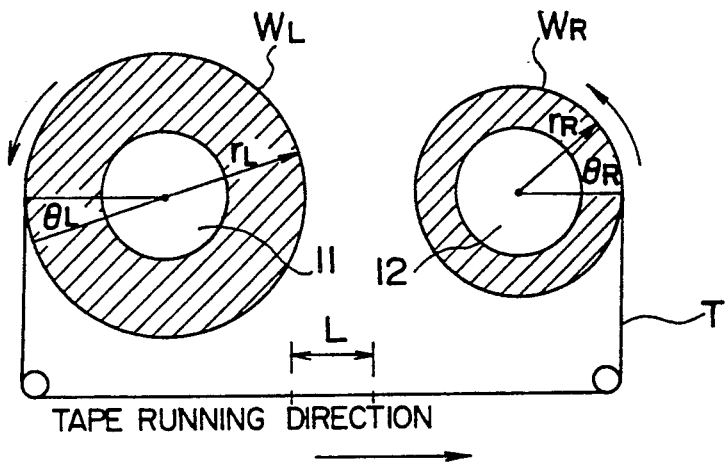
FIG. I PRIOR ART
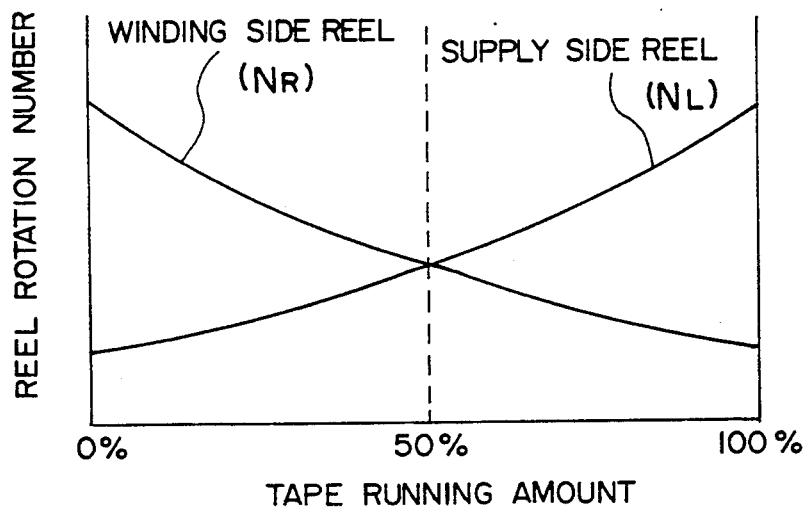
FIG. 2 PRIOR ART

LINEAR TIME COUNTER INDICATING TAPE RUNNING AMOUNT

BACKGROUND OF THE INVENTION

This invention relates to a linear time counter indicating a tape running amount.

Mathematical means for calculating a reel rotational angle to precisely determine a tape running amount on the basis of the calculated value, and approximation means for approximating a tape running time from the reel rotation number are known.

The mathematical means will be first described.

In the schematic diagram showing the tape winding relationship of FIG. 1, when it is assumed that a tape T moves by the length L from a supply reel 11 having a radius $r_L$ of the tape roll $W_L$ to a take-up reel 12 having a radius $r_R$ of the tape roll $W_R$, and at that time the supply side reel 11 rotates by an angle $\theta_L$ and the takeup reel 12 rotates by an angle $\theta_R$, the length L is expressed by the following relationships.

$$L = r_L \theta_L \quad (1)$$

$$L = r_R \theta_R \quad (2)$$

where the units of $\theta_L$ and $\theta_R$ are radian. Since the sum of the areas of the wound tape and the areas of the hubs of the supply reel 11 and the take-up reel 12 is always constant, the following relationship holds:

$$r_L^2 + r_R^2 = k \quad (k \text{ is constant}) \quad (3)$$

In this case, k is given by the following equation:

$$k = (tape\ thickness \times tape\ length + areas\ of\ the\ both\ hubs)/\pi$$

In the case of C-60 of a normal or chrome tape, since the tape width is 18 μm, the tape length is 90 mm, and the hub diameter is 22 mm, k is equal to 757.7. Further, in the case of C-60 of a metal tape, since the tape thickness is 16 μm, k is equal to 700.4.

From the equations (1), (2) and (3), the following relationship is provided:

$$(L/\theta_L)^2 + (L/\theta_R)^2 = k$$

From this equation, L is determined as follows:

$$L = \sqrt{k}\ \theta_L \theta_R / \sqrt{\theta_L^2 + \theta_R^2} \quad (4)$$

Accordingly, if rotational angles of the supply and take-up reels 11 and 12 within a certain time are measured, it is possible to determine the length L of the tape which has been moved within that time from these rotational angles. Further, if L is divided by the tape running speed at a constant speed, the running amount can be converted to time. It is to be noted that rotational angles $\theta_L$ and $\theta_R$ of the reels can be determined by the reel rotation pulse used in the auto stop.

The approximation means is disclosed in the Japanese Patent Publication No. 13994/83, and this approximation means will now be described.

FIG. 2 is a diagram showing the relationship between a tape running amount and reel rotation number. This figure indicates that according as a tape running amount increases, the rotation number $N_R$ of the take-up reel 12 decreases, and the rotation number $N_L$ of the supply reel 11 increases.

If the reel rotation number per a fixed tape running amount is fixed at any position of the tape, it is possible to determine with ease a tape running amount from the rotation number of the reel. In accordance with the graphical representation at that time, a straight line in parallel to the horizontal axis is provided. In view of this, the approximation means serves to process the graph of FIG. 2 so that it is in correspondence with a straight line in parallel to the horizontal axis, thus to determine a tape running amount.

FIG. 3 is an explanatory view of the approximation means wherein the sum $(N_L + N_R)$ of $N_L$ and $N_R$ and the difference $|N_L - N_R|$ therebetween are represented by curves, respectively. In accordance with this figure, it is seen that both the sum of $N_L$ and $N_R$ and the difference therebetween are represented by the curves the left and right halves of which are symmetrical to each other and in which the middle portions are lowered. When the difference is subtracted from the sum, the curve approximate to the straight line of the rotation number M shown in this figure is provided. Namely, the rotation number M is expressed as follows:

$$M \approx N_L + N_R - K|N_L - N_R| \quad (5)$$

Namely, the value obtained by subtracting the difference from the sum of the rotation numbers of the reel can be considered to be approximate to the straight line M. In the above equation, K indicates a ratio between $((N_L + N_R) - M)$ and $(|N_L - N_R|)$. In order to allow the accumulated error over the entire tape length to be small, the area ratio between S1 and S2 of FIG. 3 is used as the value of K.

Namely, since the rotation number M is the sum of the rotation number of the supply reel 11 and that of the take-up reel 12 with respect to a fixed tape running amount at the central portion (at which the rotation number on the supply reel 11 and that on the take-up reel 12 become the same) of the length of the tape, the rotation number of the supply reel 11 and that of the take-up reel 12 can be replaced by the rotation number at the central portion of the tape from the above-mentioned equation (5).

Accordingly, when it is assumed that a fixed tape running amount initially set is 47.6 mm/sec, and the rotation number of the supply reel 11 and that of the take-up reel 12 within a fixed time are represented by $N_{L1}$ and $N_{R1}$, respectively, the tape running amount L1 is expressed as follows:

$$L1 = 47.6 \times (N_{L1} + N_{R1} - K|N_{L1} - N_{R1}|)/M$$

This tape running amount L1 in terms of the running time t at the time of a constant speed (47.6 mm/sec) is rewritten as follows:

$$t = L1/47.6 = (N_{L1} + N_{R1} - K|N_{L1} - N_{R1}|)/M \quad (6)$$

Attention is first drawn to the processing by the mathematical means. Since only $\sqrt{k}$ can be dealt as a constant as indicated by the above-mentioned equation (4), the remaining parts must be determined by calculation. However, that calculation is a complicated calculation including multiplication, second power and root. 4 bit microcomputers frequently used in cassette decks, etc. at present have no multiplicative instruction, and other 4 bit microcomputers hardly have such an instruction. In addition, instructions for second power, root and division are required. Further, when attention is drawn to the tape running amount at the time of fast forwarding and rewinding, the calculation therefor must be conducted in 5 msec. Such 4 bit microcomputers are hardly able to carry out this calculation while conducting other processing.

On the other hand, in the case of the approximation means, as indicated by the equation (6), the equation to be dealt is more simple than the equation (4) to be dealt by the mathematical means. However, generally at present, detection of the rotation of the reel is carried out by the combination of an eight-pole magnet and a Hall IC. To determine the rotation number, a procedure must be taken to count a time required for one revolution (actually, time required for ⅛ rotation×8) to take an inverse number thereof. In the case where such a procedure is taken, the above-mentioned equation (6) is rewritten as follows:

$$t=(1/t_L+1/t_R-K|1/t_L-1/t_R|)/M \qquad (7)$$

Also in the case of the approximation means, complicated calculation is required. In the above equation (7), $t_L$ is a time required for one rotation of the supply reel 11, $t_R$ is a time required for one rotation of the take-up reel 12, and K is the above-mentioned constant.

In addition, in order to calculate the accumulated value of the running times, these times t must be repeatedly calculated many times. As a result, the processing increasingly becomes complicated.

As stated above, in both the cases of the above-mentioned mathematical means and approximation means, complicated calculation is required. Thus, the burden on the 4 bit microcomputer would be large.

SUMMARY OF THE INVENTION

An object of this invention is to provide a linear time counter which can calculate an accumulated value of the tape running times, which can carry out processing in a manner that a considerably large burden is not given to a four bit microcomputer even in the case where such a small computer is used, and which can simplify the circuit and save the expense.

To achieve the above-described object, a linear time counter according to this invention employs an approach to detect the number of reel rotation pulses or reel rotation pulse edges in places of the reel rotations to allow a fixed time required for measurement of the reel rotation number to be a time at which any one of the supply reel and the take-up reel rotates by one interval of the reel rotation pulses or reel rotation pulse edges (the pulse edge refers to the rising portion or the falling portion of the pulse). Thus, the number of the other reel rotation pulses or reel rotation pulse edges will be limited to several. Accordingly, when an approach is employed to calculate in advance running times with respect to respective numbers of several rotation pulses or reel rotation pulse edges to write those times, as constants, into the count and calculation processing portion, a necessary constant is only read out every time from the count and calculation processing portion to perform additive or subtractive calculation thereof, thereby making it possible to calculate an accumulated value of the tape running amounts. Accordingly, it has become unnecessary to repeatedly calculate, within a microcomputer, tape running times within a fixed time by using a complicated calculation formula.

Namely, the linear pulse counter according to this invention is characterized by the provision of a reel rotation pulse detection mechanism for detecting the number of reel rotation pulses or reel rotation pulse edges, and a count and calculation processing portion for performing additive or subtractive calculation of tape running time t given below to calculate an accumulated value of the tape running times; wherein when any one of the supply reel and the take-up reel rotates by one interval of the reel rotation pulses or reel rotation pulse edges, the number of reel rotation pulse or reel rotation pulse edges counted by the other reel is assumed as n, and the above-mentioned tape running time t obtained by converting a tape running amount is to a running time at the time of a constant speed running on the basis of the above-mentioned n is given as follows:

$$t=(1+n-K|1-n1|)/M \qquad (10)$$

where K is a constant determined by the tape thickness, the tape length and the radius of the hubs, and M is a constant determined by the sum of reel rotation pulses and reel rotation pulse edges of the supply and take-up reels with respect to a fixed tape running amount at the center of the length of the tape.

Prior to entering the calculation processing, values of tape running times t are calculated with respect to values of n which can be taken in advance by using the above-described equation (10), and are written as constants into the count and calculation processing portion.

When the supply and take-up reels 11 and 12 rotate, respective numbers of reel rotation pulses or reel rotation pulse edges are detected by the reel rotation pulse detection mechanism provided at the reels. These numbers of reel rotation pulses or reel rotation pulse edges thus detected are delivered to the count and calculation processing portion. In the case where when one reel rotates by one interval of the reel rotation pulses or reel rotation pulse edges, the number of reel rotation pulses or reel rotation pulse edges counted by the other reel is assumed as n, the count and calculation processing portion examines the above-mentioned n. Then, values of the tape running times t corresponding to the number n of reel rotation pulses or reel rotation pulse edges of the other reel are repeatedly read out from the count and calculation processing portion. These values are added or subtracted. Thus, an accumulated value of the tape running times are calculated.

BRIEF DESCRIPTION OF THE DRAWINGS

In the accompanying drawngs:

FIG. 1 is a schematic diagram showing a general tape winding relationship;

FIG. 2 is a view showing the relationship between the tape running amount and the reel rotation number in a conventional calculation of the tape running amount;

DETAILED DESCRIPTION OF THE PREFERRED EMBODIMENTS

A preferred embodiment of this invention will now be described with reference to the attached drawings.

Figure 3:
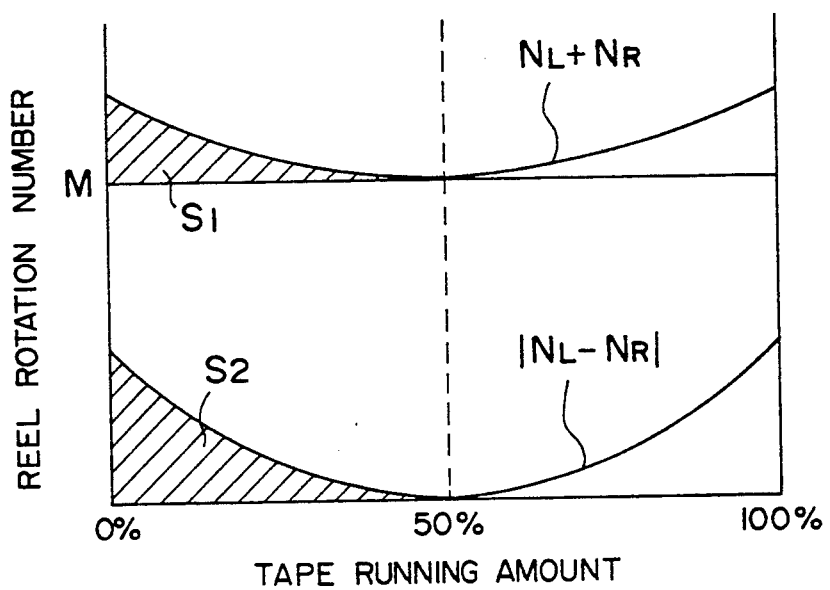
FIG. 3 is an explanatory view of the approximation means as a conventional running amount calculation means.
Figure 4:
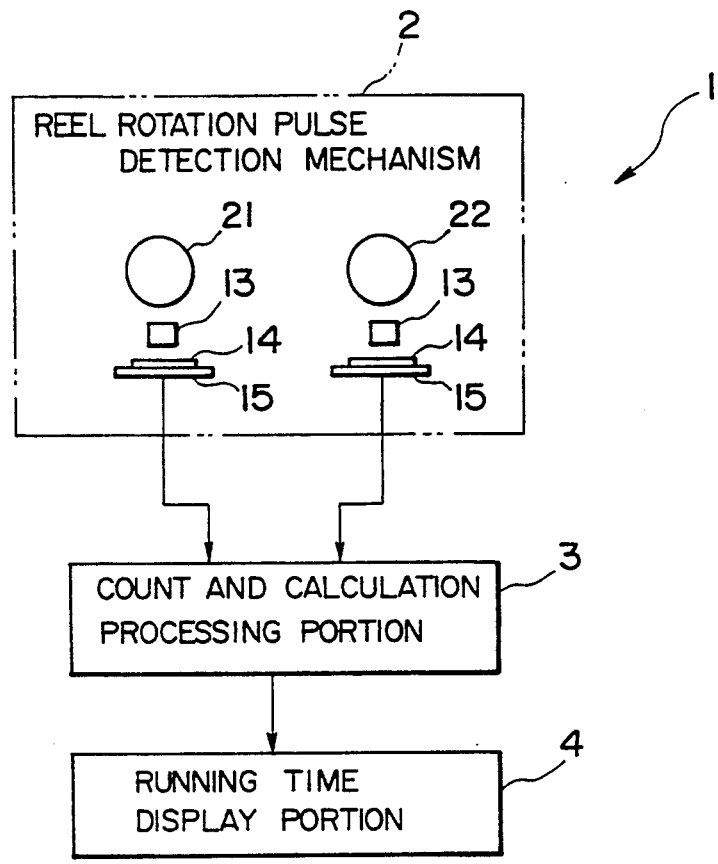
FIG. 4 is a block diagram of a linear time counter according to this invention.

FIG. 4 is a block diagram of a linear time counter according to this invention.

The linear time counter 1 is comprised of a reel rotation pulse detection mechanism 2, a count and calculation processing portion 3, and a running time display portion 4.

Figure 5:
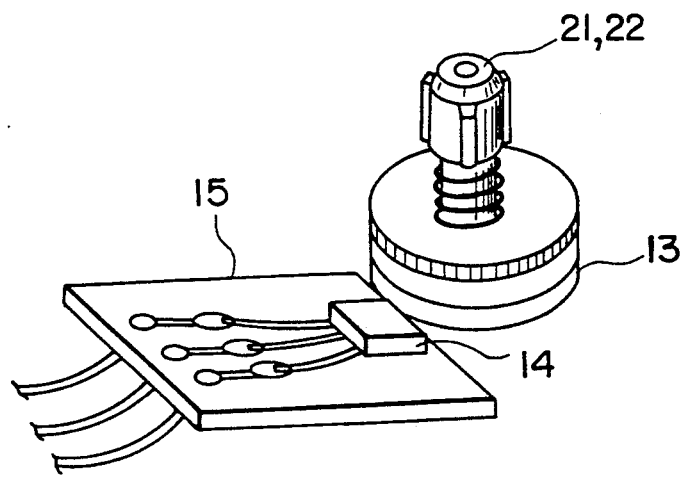
FIG. 5 is a schematic diagram of the reel rotation pulse detection mechanism of the counter shown in FIG. 4.

More particularly, the reel rotation pulse detection mechanism 2 is comprised of a supply reel disk 21, a take-up reel disk 22, magnets 13, Hall ICs 14, and Hall IC holding substrates 15. The supply reel disk 21 and take-up reel disk 22 are inserted into holes of the supply reel 11 and take-up reel 12, respectively, and rotate together therewith. FIG. 5 is a schematic diagram of a reel disk on one side of the reel rotation pulse detection mechanism 2. This detection mechanism is of a structure such that a face-magnetized magnet 13 rotating interlocking with the rotation of the reel is provided at the lower part of the reel disk 21 or 22 to detect, by the Hall IC 14, magnetism produced by the rotation of the magnet 13 as rotation pulses. Further, the Hall IC 14 is fixed on the Hall IC holding substrate 15.

As shown in FIGS. 4 and 5, the magnet 13, the Hall IC 14 and the Hall IC holding substrate 15 on the side of the supply reel 21 have the same configuration as the magnet 13, the Hall IC 14 and the Hall IC holding substrate on the side of the take-up reel 22. Therefore, the rotation pulses occurring while the supply reel 21 rotates in one rotation, are the same as the rotation pulses occurring while the take-up reel 22 rotates in one rotation.

The count and calculation processing portion 3 is comprised of a 4 bit microcomputer.

The running time display portion 4 is comprised of a liquid crystal (not shown), etc. to display an accumulated time. For display, a device such as light emitting diodes, or a display tube, etc. may be used in addition to the above-mentioned liquid crystal.

The operation of the linear time counter thus constructed will now be described.

When the supply reel disk 21 and the take-up side reel disk 22 rotate, so the tape runs, the reel rotation pulse detection mechanism 2 detects pulse edges of the rotation pulses for the reel disks 21 and 22 interlocking with the rotation. The rotation pulse edge detection signal is then delivered to the count and calculation processing portion 3.

Prior to entering the calculation processing, running times t with respect to the number n of the rotation pulse edges are calculated in advance in accordance with the above-mentioned equation (10) to write them as constants into a program ROM (not shown) in the count and calculation processing portion 3.

The number of rotation pulse edges will now be described.

A difference between the number of rotations of the supply reel disk 21 and that of the take-up reel disk 22 is equal to a difference between the diameters of the outer circumferences of the tape rolls wound on the reels. In the case of the cassette tape, the minimum value of the diameter is equal to a diameter of the reel hub on which the tape is wound (about 22 mm in the case of a small hub), and the maximum value is a value corresponding to the state where the entirety of the tape is wound (about 50 mm in the case of a normal tape). Accordingly, the ratio between the minimum value and the maximum value of the reel rotation number is less than 3, so the above-mentioned n does not take a value except for 1, 2 and 3 (fractions lower than decimal point of the value of the above ratio are raised to unit). Accordingly, if value of t with respect to $n=1, 2, 3$ are calculated in advance by the above-mentioned equation (10) to store them into the program ROM, this is sufficient.

Since the value of takes a value varying in dependency upon the thickness and length of the tape, or the diameter of the reel hub, several kinds of values n may be stored in advance into the program ROM. In this embodiment, the case where is equal to 3 will be described. It is assumed here that values of n and t with respect to the metal tape and tapes except for the metal tape are stored into the program ROM.

Figure 6:
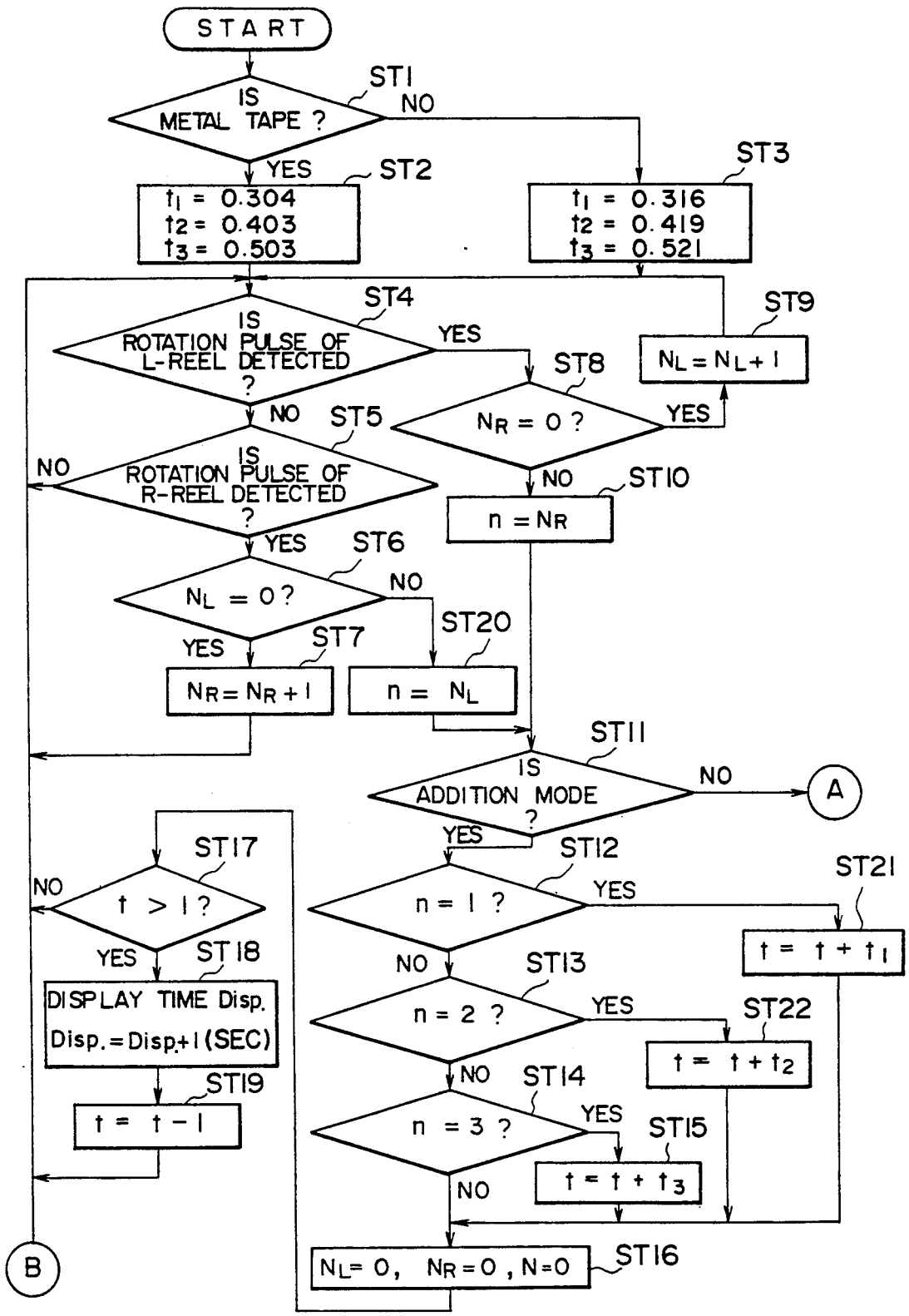
FIG. 6 is a flowchart A of the count and calculation processing portion of the counter shown in FIG. 4.
Figure 7:
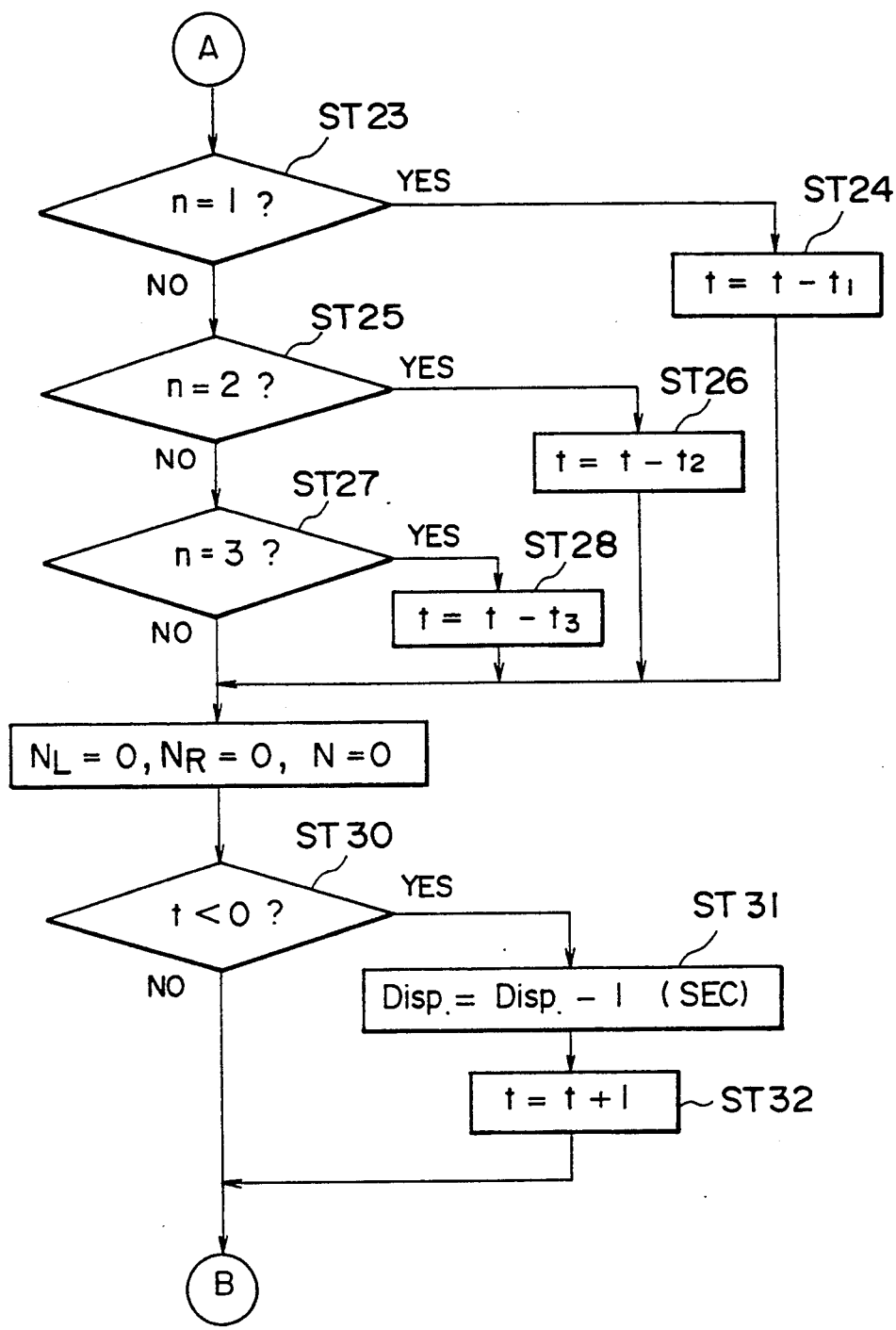
FIG. 7 is a flowchart B of the count and calculation processing portion of the counter shown in FIG. 4.

FIGS. 6 and 7 are flowcharts showing the process of the calculation processing by the count calculation processing unit 3 according to this invention. In FIG. 6, when running of the tape starts, the count calculation processing unit 3 first examines the kind of the tape at step ST1. As a result, if the subject tape is judged as a metal tape, the calculation processing proceeds to step S2, while if the subject tape is a tape except for the metal tape, the calculation processing proceeds to step S3, thus to ensure, as constants, values of t of a predetermined group of values t written in advance into the program ROM. Namely, at the steps subsequent thereto, values of t with respect to n will be read out every time from a group of constants thus ensured. At step ST4, whether or not the reel rotation pulse edge for the supply reel (hereinafter referred to as an L reel) is detected is examined. As a result, if the reel rotation pulse edge for that reel is not detected, the calculation processing proceeds to step ST5 to similarly make an examination with respect to the take-up reel (hereinafter referred to as an R reel) as well. As a result, if the reel rotation pulse edge for the R reel is not detected, the calculation processing returns to the step ST4 for a second time to repeatedly execute this operation until the reel rotation pulse edge is detected at the step ST4 or ST5. When it is now assumed that the initial reel rotation pulse edge for the R reel is detected at the step ST5, the calculation processing proceeds to step ST6 to examine the number $N_L$ of reel rotation pulse edges of the L reel at this time. Since the $N_L$ is equal to zero at this time point, the calculation processing proceeds to step ST7 to count up from "0" to "1" the value of the number $N_R$ of reel rotation pulse edges of the R reel to return to the step ST4 for a second time. When $N_R$ becomes equal to 3 (three) by repeatedly executing the above-mentioned operation, so the reel rotation pulse edge for the L reel is detected, the calculation processing proceeds from the step ST4 to Step ST8. Since $N_R$ is not equal to "0" at the step ST8, the calculation processing does not proceed to step ST9, but proceeds to step ST10. At this time, since $N_R$ is equal to 3 at the step ST10, 3 is entered as of the equation (10). Namely, n becomes equal to 3. The calculation processing then proceeds to step ST11, at which either the additive mode or the subtractive mode is selected in dependency upon the tape running direction. Assuming now that the additive mode is selected, the calculation proceeds to step ST12 and step ST13. Since n is equal to 3 at step ST14, the calculation processing proceeds from the step ST14 to step ST15. At the step ST15, the value of t with respect to n=3 is read out from the program ROM to enter t3=0.503 (in the case of the metal tape) into t. The value of t is added every time t is processed at the step ST15. In the case where t is processed at steps ST21 and ST22, additive processing similar to the above is conducted. At step ST16, values of $N_L$, $N_R$ and N are reset, and the calculation processing proceeds to step ST17. At the step ST17, whether or not the value of t (the unit in this embodiment is second) is above 1 is examined. If that value is less than 1, the calculation processing returns to the step ST4 for a second time to repeatedly execute the similar procedure. By this repetitive execution, t is added in succession. When the value of t is above 1, the calculation processing proceeds from the step ST17 to the step ST18. At this step, "1" (sec.) is displayed at the running time display portion 4. Thus, one cycle of the calculation processing is completed. Subsequently, at step ST19, 1 is subtracted from the value of t (i.e., the value is caused to be less than 1). The calculation processing returns to the step ST4 for a second time to add the display time of the running display portion 4 one by one in accordance with the similar procedure.

In the case where $N_L$ is equal to 3, the calculation processing proceeds from the step ST6 to step ST20 to enter 3 into n. At times subsequent thereto, the calculation processing is conducted similarly to the case of $N_R = 3$.

When n is equal to 1 at the step ST12, the calculation processing proceeds to the step ST21. Further, when is equal to 2, the calculation processing proceeds to the step ST22. At these steps, the values of t1 and t2 are read out from the program ROM, respectively. Thereafter, the calculation processing proceeds to the step ST16.

On the other hand, when the substractive mode is selected at the step ST11, the calculation processing proceeds to step ST23 in the flowchart B of FIG. 7. If n is equal to 1, t1 is read out from the program ROM at step ST24. At this time, if a value is already set as t, t1 is subtracted from t. Similarly, when n is equal to 2, t2 is read out from the program ROM at steps ST25 and ST26. Further, when n is equal to 3, t3 is read out from the program ROM at steps ST27 and 28. At step ST29, $N_L$ $N_R$ and N are reset. At step ST30, whether or not the value of t is less than 0 is examined. Unless the value of t is less than 0, the calculation processing returns to the step ST4. In contrast, if the value of t is less than 0, the calculation processing proceeds to step ST31 to substract 1 from the display time. Thereafter, 1 is added to t at step ST32 (i.e., the value of t is caused to be a positive value) to return to the step ST4 for a second time. At times subsequent thereto, the value displayed at the running display portion 4 is subtracted one by one in accordance with the similar procedure.

Thus, only by employing a procedure to detect the number n of the reel rotation pulse edges of the supply reel or the winding reel to read out the values of t with respect to the values of n as constants from the program ROM to repeatedly perform additive or subtractive calculation of the values of t thus read, an accumulated value of the tape running times can be displayed.

As described above, the linear time counter according to this invention employs a scheme in which when the number of reel rotation pulses or reel rotation pulse edges of one reel with respect to one interval of the reel rotation pulses or reel rotation pulse edges of the other reel is assumed as n, the running time t with respect to the n is calculated on the basis of the above-mentioned n in accordance with the equation (10), thus to use the values of t as constants. Thus, it is sufficient to calculate only a limited number of values of t. Further, by only repeatedly performing additive or subtractive calculation of the values of t, an accumulated value of the tape running times can be calculated. Namely, since the count calculation processing portion is only required to have an ability of performing additive or subtractive calculation, any four bit microcomputer may be used for the count calculation processing. Thus, the circuit configuration can be simplified and the expense can be saved.

What is claimed is:

1. A linear time counter adapted to calculate a reel rotation number to thereby detect and display a running amount of a tape, said linear time counter comprising:

rotation pulse generation means for generating supply reel rotation pulses and take-up reel rotation pulses which correspond to a ratio of the rotation number between a supply reel and a take-up reel on supply and take-up disks, the supply reel rotation pulses being equal to the take-up reel rotation pulses for one complete rotation of the reels, reel rotation pulse detection means for respectively detecting said rotation pulses which are generated by said rotation pulse generation means with respect to said supply and said take-up reels on said supply and said take-up disks, respectively, count means for counting a number of rotation pulses detected by said reel rotation pulse detection means of exclusively a selected one of either said supply reel or said take-up reel during rotation corresponding to one interval of the rotation pulses associated with the other reel, and continuing to count rotation pulses from said selected reel until a midway portion of the tape is reached upon which said count means switches to count rotation pulses from the other reel, and calculation means for converting a running amount of said tape to running times at a time of a constant speed running in accordance with the number of said rotation pulses to add and/or subtract values of the running times to thereby calculate an accumulated value of actual tape running times.

2. The linear time counter as set forth in claim 1, wherein said calculation means calculates converted running time t in accordance with the equation:

$$t = (1 + n - K|1 - n|)/M,$$

where K is a constant determined by the thickness and the length of said tape, and the radius of the hubs of said reels, n is the number of rotation pulses which are counted by said count means, and M is a constant determined by the sum of the numbers of said rotation pulses of said supply reel and said take-up reel with respect to a fixed tape running amount at the central portion of the entire length of said tape.

3. The linear time counter as set forth in claim 1, wherein said reel rotation pulse detection means detects rotation pulses of both said reels by counting pulse edges serving as the rising portion or falling portion of the pulse.

4. The linear time counter as set forth in claim 1, wherein said reel rotation pulse detection means is comprised of a reel rotation pulse detection mechanism including supply and take-up reel disks rotating together with the supply and take-up reels, respectively, two face-magnetized magnets provided at lower parts of said respective reel disks and adapted to rotate interlocking with rotations of said reels and Hall IC elements for detecting, as rotation pulses, magnetism produced by rotation of said magnets.

5. The linear time counter as set forth in claim 1, wherein said count means and said calculation means belongs to a count and calculation processing portion comprised of a four bit microcomputer.

6. The linear time counter as set forth in claim 1, which further comprises display means for displaying an accumulated value of said actual tape running times outputted from said calculation means.

7. The linear time counter as set forth in claim 1, wherein said calculation means comprises memory means for sorting a delivery time which is converted corresponding to said number of said rotation pulses counted by said count means and is calculated before calculation processing by said calculation means, and wherein said calculation means reads out said delivery time stored in said memory means during said calculation processing.

* * * * *